April 19, 1949.                W. BRUBAKER                2,467,520
                    REATTACHABLE GASOLINE HOSE COUPLING
                            Filed Oct. 12, 1946
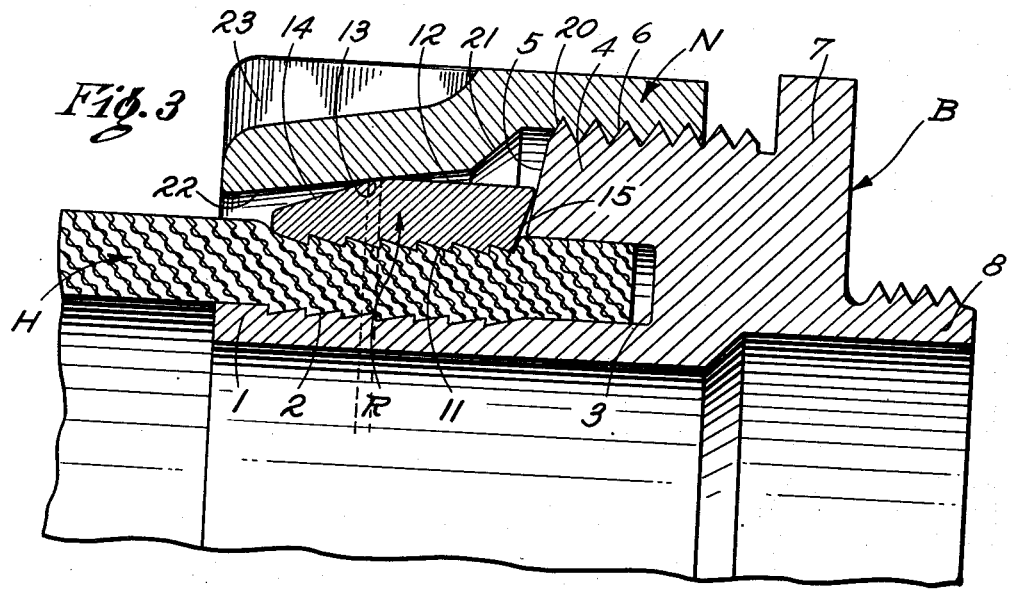
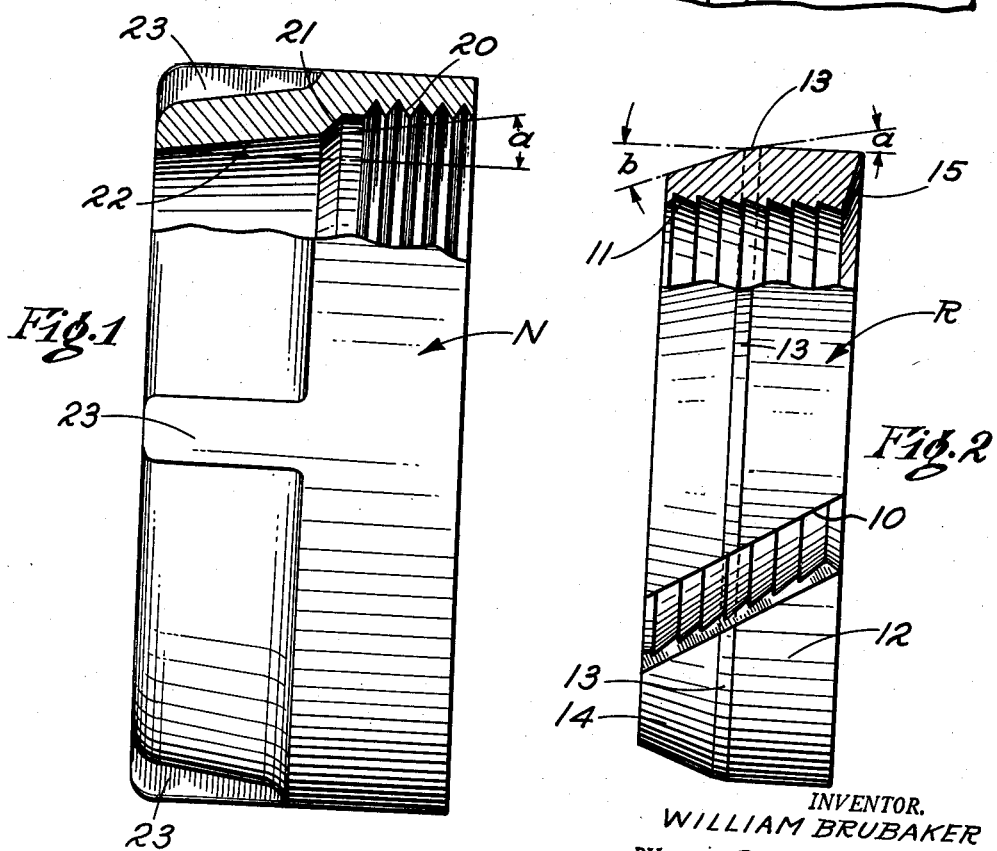
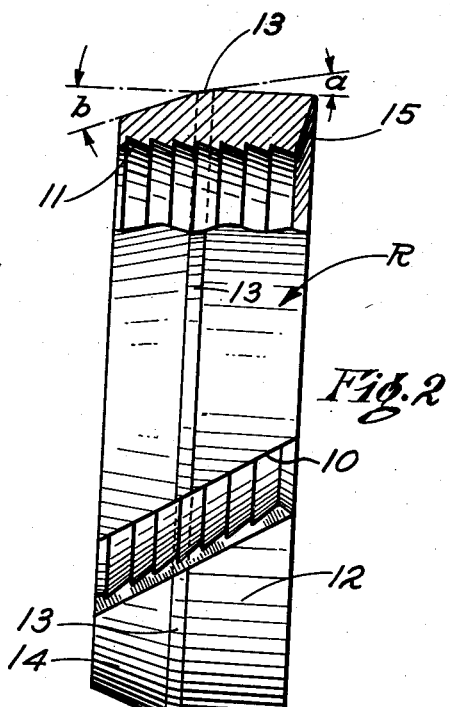
INVENTOR.
WILLIAM BRUBAKER
BY
ATTORNEYS Patented Apr. 19, 1949

2,467,520

UNITED STATES PATENT OFFICE 2,467,520

REATTACHABLE GASOLINE HOSE COUPLING

William Brubaker, Wooster, Ohio, assignor to Akron Brass Manufacturing Company, Inc., Wooster, Ohio, a corporation of Ohio Application October 12, 1946, Serial No. 702,927

5 Claims. (Cl. 285—86)

This invention relates to hose couplings and more particularly to a coupling which can be attached to and reattached to a flexible hose such as a gasoline or fire hose. This invention is a modification of the hose coupling disclosed in my co-pending application #655,804, filed March 20, 1946.

The hose coupling of the type to which this invention relates is one wherein a split ring member is compressed about the hose to grip the same and provide a fluid seal. Such ring members in the prior art, particularly when employed with the larger size hoses, have offered a relatively large amount of frictional resistance against the nut which compresses the ring. This has made it difficult to apply a sufficient force to grip the hose strongly with the result that the user was often deluded into believing that the ring was gripping the hose tightly, merely because he was forced to exert a large torque on the fitting parts to overcome friction.

Accordingly, it is an object of this invention to reduce the torque required to obtain a perfect seal and strong joint and, at the same time, to insure that friction forces are reduced to a minimum whereby the hose gripping ring can flow during setting up of the coupling thereby insuring the most effective utilization of the compression force applied to it.

It is well known that in the manufacture of hose tolerances are permitted for both the inside and outside diameters. For example, in the 2½" hose it would not be uncommon for the inside diameter to be 1/16" undersize and the outside diameter 1/16" oversize. This presents some difficulty in assembling a coupling with the hose in that since the hose wall is thicker than standard a much greater compressive force is required to compress the ring about the hose. It is a further object of this invention to provide a coupling which will handle hose manufactured within a reasonable range of tolerances without the necessity of severe tightening pressure for the coupling and with assurance that a perfect joint will result.

Similarly, there is a tolerance in the concentricity of the interior and exterior surfaces of the hose. This may result in an unequal wall thickness and since the fitting parts are all centered mechanically with respect to the hose insert, the flexible gripping ring must assume a helical form if it is to effectively grip the entire hose circumference. It is another object of this invention to provide a fitting that permits the grip ring to cant in the coupling the ring being in pressure contact with the hose and fitting parts at all times.

These and other objects and advantages and the manner in which the objects are realized will appear in the following description which, considered in connection with the accompanying drawings, sets forth the preferred embodiment of the invention.

In the drawings:

Fig. 1 is a view of the nut member partially broken away;

Fig. 2 is a view of the flexible ring with parts broken away; and

Fig. 3 is a partially enlarged view of the assembled hose coupling and hose.

The fitting consists of three parts, a tubular body B, a nut N and a split ring R. The body B has a hose insert portion 1 which is provided with external biting teeth 2 for gripping the interior of the hose. The body B may be chambered as at 3 for reception of an end of the hose H. The outer annular portion 4 of the fitting body terminates in a convex conical face 5 for reasons to be hereinafter more fully described. The body is exteriorly threaded as at 6 to receive the nut N and a polygonal portion 7 may be provided for reception of a tool. An outwardly extending threaded lip 8 may be provided to facilitate connection of the hose to a nozzle and to any other member.

The resilient ring R is split as at 10 at an angle of about 30° to its axis to permit compression of the ring about the hose and to compensate for diametric variations therein. The inner surface of the ring is provided with a series of forwardly facing biting teeth 11. The external surface of the ring is preferably formed with three separate surfaces disposed in angular relation to one another. For example, the surface 12 is generally cylindrical and concentric to the ring axis. The narrow surface or land 13 is at an angle with respect to the axis of the ring. This angle, designated $a$ in Fig. 2, equals about 8° and it has been found that for the couplings normally employed in gasoline and fire hose applications that the 8° angle produces satisfactory results. The surface 14 is at a less acute angle $b$ with respect to the axis of the ring. The angle $b$ is such that only the land 13 engages the nut, otherwise the angle $b$ is not critical. It has been found that an angle in the neighborhood of 20° is satisfactory for angle $b$. The forward face 15 of the ring R, which engages face 5 of the body, deviates slightly from the perpendicular to the axis of the ring. For example, the angle of the face 15 relative to the axis of the ring may be 85° and the angle of face 5 on the body B relative to the axis of the ring may be 80°. With such construction the leading edge of the ring engages the body and this reduces the friction of the ring against the body and in addition permits it to assume the position which most effectively grips the hose as the ring is compressed. The conical face 5 on the body has another important function to be described presently.

The ring is compressed about the hose by means of nut N which is formed with an internal threaded lip 20 for engagement with threads 6 on the body B, a beveled shoulder 21 and an internal tapered surface 22 which engages the land 13 on the ring and causes the compression thereof about the hose. The angle $a$ of the tapered surface 22 is preferably equal to the angle $a$ of the land 13 on the ring so that there is an area of contact between the ring and the nut wide enough to prevent the ring from cutting into the nut but narrow enough to minimize the friction between those parts. Lugs 23 may be provided to facilitate application of torque to the nut, or if desired a hexagonal or octagonal flange may be provided for reception of a conventional wrench.

In assembling the coupling with the hose, the nut N and the ring R are slipped over the end of the hose and the hose is forced over the insert 1 of the body, with the end of the hose projecting into the groove 3 in the body. Although the end of the hose may abut the radial wall of the groove 3, the coupling will operate if the hose end stops short of the wall as shown in Fig. 3. The nut is then threaded upon the body and tightened whereupon the ring is compressed about the hose and the hose is moved axially forward until the face 15 of the ring engages face 5 of the body. Further tightening of the nut exerts a powerful compressing action of the ring about the hose, which action is resisted by a minimum of frictional force. Due to the line engagement of the inclined face 15 with the tapered face 5 of the body, the tendency of the forward portion of the ring to resist compression about the hose is minimized and furthermore a slight axial motion of the hose is provided as the ring is tightened. In case the end of the hose is assembled in abutting relation with the wall 3 of the body, this axial compression would cause the end of the hose to be forced against that wall thereby adding an additional sealing surface. Any tension on the hose tending to strip it from the coupling will cause the land 13 to move to the left in Fig. 3 whereupon the tapered portion 22 of the nut will exert a stronger compressive force upon the ring and hence increase the gripping action of the ring against the hose. Thus, the hose, when assembled in the coupling, will resist withdrawal up to its bursting point. The shape of the groove, as shown in the preferred embodiment, is such that the hose may be removed and reassembled without damage to the hose. Since the application of pressure is provided only at land 13, the ring will float within the coupling, when the nut is tightened, and thus seek a position where its compressive force will be distributed uniformly rather than being localized as it would occur if a large area of engagement between the ring and the nut were provided.

If the inner and outer hose surfaces are eccentric, the improved ring will readily accommodate itself to the variation in wall thickness of the hose. At the thinner hose portions the ring will be further radially inward as it is drawn into contact with the hose than at the thicker hose portion. Since the ring remains in engagement with taper 22 the ring tends also to move away from the large diameter mouth of taper 22 at the thin portions of the hose. Hence, where eccentricity of the hose is present, the ring cants relative to the axis of the fitting. But the convex taper 5 on the fitting body permits a portion of the leading edge of the ring at the thin hose section to be disposed somewhat axially rearward and still be in engagement with taper 5 so that although the convolute engages both the thick and thin wall portion of the hose it also engages the tapered opening in the nut and the tapered body wall 5.

Although the angular relation between certain parts of the assembly has been specified in specific terminology herein, it is to be understood that such terminology is merely illustrative and that modification thereof may be resorted to without sacrifice to the structural or functional advantages of the combination. For example, the angle and width of the portion of the ring that engages the conical bore in the nut may be changed without departing from the spirit of the invention so long as the line or surface of contact permits a floating action of the ring and deformation thereof compensative of irregularities in the wall thickness of the hose. It is desirable that the land 13 be disposed adjacent the longitudinal center of the conical bore in the ring but it may be displaced therefrom without departing from the spirit of the invention.

Although the foregoing description is necessarily of a detailed character, in order that the invention may be completely set forth, it is to be understood that the specific terminology is not intended to be restrictive or confining and that various rearrangements of parts and modifications of detail may be resorted to without departing from the scope or spirit of the invention as herein claimed.

What is claimed is:

1. A hose coupling comprising a body member having an axially outer flange portion and an axially inwardly extending hose insert portion, a compression member surrounding said hose insert portion and adapted to be drawn toward said body flange portion, and a split ring adapted to surround said hose insert portion and clamp a hose, one of said members having a generally tapered internal wall adapted to engage an external surface of said ring, the other of said members having a shoulder disposed adjacent the larger diameter of said tapered wall and adapted to engage an edge of said ring, the taper in said one member being arranged to cause compression of said ring as said compression member is drawn toward said body flange portion, the relation of said generally tapered internal wall to the external ring surface engaged thereby being such that engagement between said wall and ring takes place along a relatively narrow band adjacent the midplane of the ring whereby said ring may float within the tapered wall.

2. A hose coupling comprising a body member having a sleeve for insertion within the hose, a threaded shank on said body member, a nut member having a bore therein threaded on said shank, a split ring circumambient the sleeve for gripping the hose, one of said members having a portion overlying and engaging an external portion of said split ring, said engaging portions being formed so that their engagement has the characteristics of a tapered surface engaged by a relatively thin edge, the other of said members having a convexly tapered edge part engaging an edge of said split ring, whereby a portion of the split ring is free to assume an angular relation to its normally radial plane upon adjustment of the nut member.

3. A hose coupling comprising a body member having an axially outer flange portion and an axially inwardly extending hose insert portion, a compression member surrounding said hose insert portion and adapted to be drawn toward said body flange portion, and a split ring having a concave edge adapted to surround said hose insert portion and clamp a hose, one of said members having a generally tapered internal wall adapted to engage an external surface of said ring, the other of said members having a generally convex shoulder disposed adjacent the larger diameter of said tapered wall arranged to engage a radially outer portion of the concave edge of said ring, the taper in said one member being arranged to cause compression of said ring as said compression member is drawn toward said body flange portion, the relation of said generally tapered internal wall to the external ring surface engaged thereby being such that engagement between said wall and ring takes place along a relatively narrow band adjacent the midplane of the ring whereby said ring may cant within the tapered wall and maintain its edge engagement with said body shoulder.

4. A hose coupling comprising a body having a hose insert portion, a split ring member for gripping the hose and compression means threaded to said body, said compression means having a forwardly flaring internal surface for engaging the split ring, the external surface of said split ring including a narrow external annular land engaged by said flaring surface, the balance of said external ring surface being spaced from said flaring surface, whereby said ring is free to assume a helical form when the fitting is tightened against a hose having eccentric surfaces.

5. A hose coupling comprising a body having a hose insert portion, and a lip for surrounding an end portion of the hose, said lip having a generally convexly tapered edge, a split ring member for gripping the hose and compression means threaded to said body, said compression means having a forwardly flaring internal surface for engaging the split ring, the external surface of said split ring including a narrow centrally disposed external annular land engaged by and complementary to said flaring surface, the balance of said external ring surface being spaced from said flaring surface, the forward edge of said ring and the rearward edge of said body lip diverging so that the parts engage radially outwardly of the bore whereby said ring can accommodate itself to an eccentric hose without excessive binding against the fitting parts.

WILLIAM BRUBAKER.

REFERENCES CITED

The following references are of record in the file of this patent:

UNITED STATES PATENTS

| Number | Name | Date |
|---|---|---|
| 418,906 | Bosworth | Jan. 7, 1890 |
| 2,152,975 | Sanford | Apr. 4, 1939 |